US012774915B2

(12) United States Patent
Fölling

(10) Patent No.: US 12,774,915 B2
(45) Date of Patent: Oct. 27, 2026

(54) METHOD FOR DETERMINING A LOWER BOUNDARY SURFACE AND/OR AN UPPER BOUNDARY SURFACE OF A LIQUID LOCATED IN A CONTAINER

(71) Applicant: CYTENA GmbH, Freiburg (DE)

(72) Inventor: Jonas Fölling, Freiburg (DE)

(73) Assignee: CYTENA GMBH, Freiburg (DE)

( * ) Notice: Subject to any disclaimer, the term of this patent is extended or adjusted under 35 U.S.C. 154(b) by 452 days.

(21) Appl. No.: 18/087,880

(22) Filed: Dec. 23, 2022

(65) Prior Publication Data

US 2023/0204403 A1 Jun. 29, 2023

(30) Foreign Application Priority Data

Dec. 27, 2021 (LU) ........................................ 501093

(51) Int. Cl.
*G01F 23/292* (2006.01)
*G01B 9/0209* (2022.01)

(52) U.S. Cl.
CPC ................................ *G01F 23/2922* (2013.01)

(58) Field of Classification Search
CPC .......... G02B 7/28; G02B 21/34; G02B 21/26; G02B 21/33; G02B 21/365; G02B 21/0088; G02B 21/36; G02B 21/002; G02B 21/14; G02B 21/361; G02B 21/00; G02B 21/0032; G02B 21/367; G02B 23/145; G02B 21/0036; G02B 21/06; G02B 21/082; G02B 21/244; G02B 21/32; G02B 3/14; G02B 21/0004; G02B 21/0056; G02B 21/02; G02B 21/086; G02B 21/12; G02B 3/12; G02B 21/0052; G02B 21/0092; G02B 21/025; G02B 21/04; G02B 21/084;

(Continued)

(56) References Cited

U.S. PATENT DOCUMENTS 3,741,656 A * 6/1973 Shapiro ............... G01F 23/2928 356/342
7,323,705 B2 * 1/2008 Haga ................... G01F 23/2928 356/624

(Continued)

FOREIGN PATENT DOCUMENTS

DE 19924259 C2 * 11/2002 ........... G01F 23/292
DE 10141544 A1 3/2003

(Continued)

OTHER PUBLICATIONS

English Abstract for DE10141544A1, Accessed on Espacenet on Dec. 23, 2022.

(Continued)

*Primary Examiner* — Michael P Stafira
(74) *Attorney, Agent, or Firm* — Hodgson Russ LLP

(57) ABSTRACT

The invention relates to a method for determining a lower boundary surface and/or an upper boundary surface of a liquid in a container, in which illumination light is emitted that is focused by an objective lens at a focal point, wherein a measurement signal reflected at the focal point is detected by a two-dimensional detection device arranged in an image (Continued)

Figure 1:
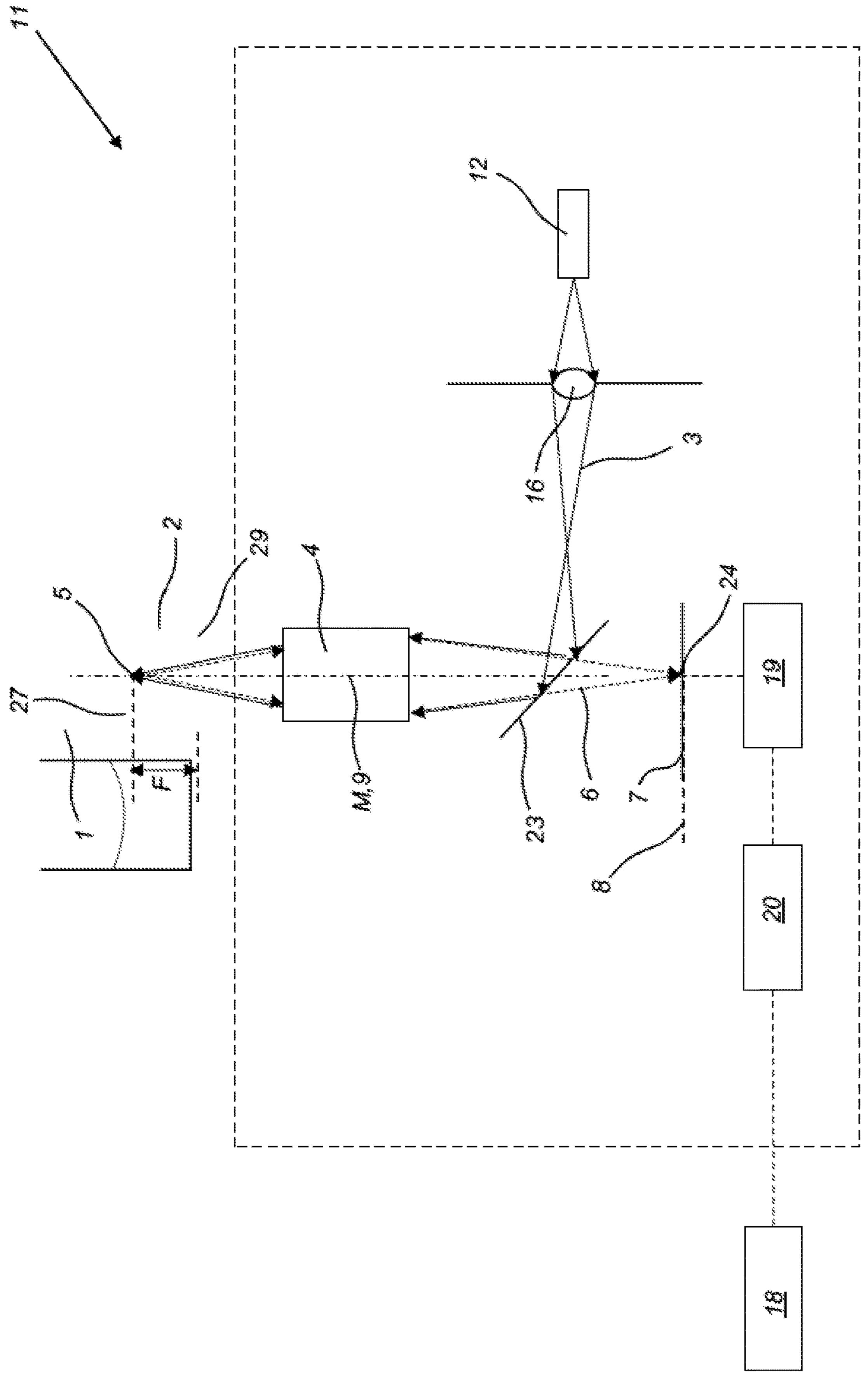

plane of the objective lens, and wherein the lower boundary surface and/or the upper boundary surface is detected based on the detected measurement signal.

20 Claims, 7 Drawing Sheets

(58) Field of Classification Search

CPC .... G02B 21/088; G02B 21/245; G02B 21/30; G02B 27/0075; G02B 7/36; G02B 21/0028; G02B 21/0096; G02B 21/18; G02B 21/24; G02B 21/241; G02B 21/248; G02B 26/06; G02B 26/0825; G02B 26/0841; G02B 27/09; G02B 27/0927; G02B 27/0994; G02B 3/0043; G02B 3/005; G02B 3/0056; G02B 3/0068; G02B 5/128; G02B 5/132; G02B 6/25; G02B 6/264; G02B 7/365; G01B 11/026; G01B 11/26; G01B 15/00; G01B 11/14; G01B 11/00; G01B 11/0675; G01B 11/24; G01B 11/2433; G01B 11/25; G01B 11/16; G01B 11/005; G01B 11/06; G01B 11/2441; G01B 11/2513; G01B 21/042; G01B 9/02015; G01B 9/02042; G01B 9/02076; G01J 3/42; G01J 3/027; G01J 2009/0211; G01J 2009/0269; G01J 9/00; G01J 9/0246; G01F 23/292; G01F 23/2928; G01F 22/00; G01F 23/28; G01F 23/80

See application file for complete search history.

(56) References Cited

U.S. PATENT DOCUMENTS

| | | | | |
|---|---|---|---|---|
| 10,094,695 | B2 * | 10/2018 | Luedemann | G01B 11/00 |
| 2008/0304082 | A1 * | 12/2008 | Gotz | G01N 35/1016<br>356/614 |
| 2017/0205270 | A1 | 7/2017 | Luedemann | |
| 2020/0116988 | A1 | 4/2020 | Luo | |
| 2020/0132534 | A1 | 4/2020 | Luedemann | |

FOREIGN PATENT DOCUMENTS

| | | | | | |
|---|---|---|---|---|---|
| DE | 102007011877 | A1 | * | 9/2008 | G01F 23/292 |
| DE | 102007043741 | A1 | | 3/2009 | |
| DE | 102011013195 | A1 | | 9/2012 | |
| EP | 0049542 | A1 | * | 4/1982 | G01J 5/0803 |
| EP | 3270096 | A1 | | 1/2018 | |
| EP | 3428586 | A1 | * | 1/2019 | H04N 23/695 |
| JP | H08338849 | A | * | 12/1996 | G01F 23/2928 |
| JP | 2005195878 | A | * | 7/2005 | G02B 21/0088 |
| JP | 2008504561 | A | * | 2/2008 | |
| JP | 2016165424 | A | * | 9/2016 | G01F 23/292 |
| WO | 2014023364 | A1 | | 2/2014 | |
| WO | WO-2016143515 | A1 | * | 9/2016 | A61M 37/00 |

OTHER PUBLICATIONS

Search Report and Written Opinion for LU501093, provided by the Luxembourg Intellectual Property Office on Aug. 11, 2022.

Keyence Corporation, "Keyence High-Accuracy Surface Scanning LT-9000 Series Technical Description," Copyright 2010.

* cited by examiner

METHOD FOR DETERMINING A LOWER BOUNDARY SURFACE AND/OR AN UPPER BOUNDARY SURFACE OF A LIQUID LOCATED IN A CONTAINER

The invention relates to a method for determining a lower boundary surface and/or an upper boundary surface of a liquid located in a container. In addition, the invention relates to a determination device and a dispensing device with such a determination device.

It is known from the prior art that active substances, such as monoclonal antibodies and other proteins, are produced with the aid of so-called monoclonal cell lines. These are populations of cells that are all descended from a single parent cell. The production of monoclonal cell lines is necessary because this is the only way to ensure that all cells of the population have approximately the same genome in order to produce active ingredients with constant and reproducible quality.

In order to produce a monoclonal cell line, cells are transferred individually into the containers of a microtitre plate. The cells to be transferred are produced by genetically modifying a host cell line and isolating these modified cells. Individual cells are deposited in the microtitre plates using devices that are also referred to as dispensing devices.

There is a need to detect whether the dispensed liquid containing cells or particles has entered the container. A dispensing device is known from EP 3 751 290 A1, which has a scanning device, by means of which a partial volume area in the container is scanned after a liquid has been dispensed. In operation, the liquid fill level in the container is entered by the user.

The known method has the disadvantage that the user has to enter the fill level manually and it cannot therefore be ruled out that the fill level entered is incorrect. In addition, entering the fill level is time-consuming for the user, in particular when the fill level has to be entered individually for each container. In addition, the actual fill level can differ from the entered fill level. This is the case, for example, when part of the liquid has evaporated.

The object of the invention is therefore to specify a method by means of which a lower boundary surface and/or an upper boundary surface of the liquid in the container can be determined in a simple manner.

This object is achieved by a method for determining a lower boundary surface and/or an upper boundary surface of a liquid in a container, in which

- illumination light is emitted, which is focused by an objective lens at a focal point, wherein
- a measurement signal reflected at the focal point is detected by a two-dimensional detection device arranged in an image plane of the objective lens, and wherein
- based on the detected measurement signal the lower boundary surface and/or the upper boundary surface is detected.

A further object of the invention is to provide a dispensing device in which a lower boundary surface and/or an upper boundary surface of the liquid in the container can be determined in a simple manner.

The object is achieved by a determination device for determining a lower boundary surface and/or an upper boundary surface of a liquid in the container that has

- an illumination source for emitting illumination light,
- an objective lens for focusing the illumination light at a focal point,
- a two-dimensional detection device which is arranged in an image plane of the objective lens and detects a measurement signal reflected at the focal point, and
- an evaluation device which, based on the measurement signal, determines the lower boundary surface and/or the upper boundary surface of the liquid in the container.

According to the invention, it has been recognised that a determination device working according to the focal principle can be used for the automated determination of the liquid fill level in the container. In this respect, there is no longer any need for the user to manually enter the liquid fill level in the container. However, it has been recognised that the known determination devices cannot be adopted unchanged. The container can vibrate and/or be moved during a dispensing process. This means that the measurement signal focused by the objective lens at a point in the image plane wanders in the image plane. In this respect, it is not possible to use known confocally operating determination devices, which have, for example, a one-dimensional detection device and a pinhole diaphragm arranged in front of the detection device, because the detection device receives no or only a weak measurement signal.

According to the invention, it has been recognised that the lower boundary surface and/or the upper boundary surface of the liquid in the container can be precisely determined by arranging the detection device in the image plane and using a two-dimensional detection device. In particular, a determination device designed in this way can also determine the upper boundary surface, in particular the liquid fill level, when the liquid surface moves due to vibrations or a displacement of the container. This is possible because the point moving in the image plane is detected by the determination device. Such a spatial resolution is not possible by using a one-dimensional detection device, which is also referred to as a point detector.

The determination device works according to the confocal principle. This means that the focal point and the point in the image plane are confocal to one another, i.e. they are in focus at the same time. To determine the lower boundary surface and/or the upper boundary surface, the focal point can be moved, as will be described in more detail below. The focal point can be moved from an area outside the container to an area inside the container.

A two-dimensional detection device is a detection device in which the detection elements extend in two spatial directions. In particular, the detection elements extend in the image plane. The detection device can be designed as a CCD (charge coupled devices) detector, CMOS, SPAD (single photon avalanche diode) array, as a fibre bundle in which each fibre is routed to a detector element, or the like.

The dispensed liquid can contain at least one biological particle. The biological particles can be microorganisms, such as bacteria, archaea, yeast, fungi, and viruses, or cells, DNA, RNA or proteins. The liquid can contain one or a plurality of the aforementioned biological particles. The liquid can be a cell suspension that can promote growth of the cells arranged in the liquid. Alternatively, the particle can be a glass or polymer bead and have substantially the same volume as a cell. The dispensed liquid of the liquid sample can be the same liquid that is arranged in the container.

The illumination source can emit illumination light with a predetermined wavelength. The illumination source can be a glass fibre into which light has been coupled, or a laser diode. Other punctiform illumination sources, such as an illuminated pinhole (aperture) are also possible. Other lasers are also possible illumination sources.

The upper boundary surface corresponds to a liquid surface, in particular a phase boundary between the liquid and the air. The lower boundary surface is offset from the upper boundary surface, in particular along a central axis of the container. The lower boundary surface forms a liquid bottom and/or is a phase boundary between the liquid and a container bottom. During operation, the determination device, in particular the detection device and/or the objective lens, can be arranged below the container, in particular in relation to the central axis of the container.

According to one aspect of the invention, a dispensing device can be provided that has a determination device according to the invention. The dispensing device can have a dispenser for dispensing liquid into the container.

The liquid sample dispensed by means of the dispensing device can be an, in particular free-flying, droplet. The liquid droplet can have a volume ranging from 1 pl (picolitre) to 1 μl (microlitre). In this case, the dispensing of the sample can be performed according to a drop-on-demand mode of operation. In this case, the dispensing device provides a discrete and not a continuous dispensing of the sample. To implement the drop-on-demand mode of operation, the dispensing device can have an actuating means, which can, for example, be a piezoelectrically operated actuator. Alternatively, the discharged liquid can be a liquid jet that, after being discharged from a dispensing device of the dispensing device, optionally breaks up into individual liquid droplets.

The dispensing device can have a section, particularly a mechanical diaphragm, that is actuatable by the actuating means. When the actuating means is actuated, the liquid, in particular a droplet or jet of liquid, is ejected from the dispenser of the dispensing device.

No particles can be contained in the liquid dispensed from the dispensing device. Alternatively, a single particle may be contained in the liquid being dispensed. In addition, more than a single particle may be contained in the liquid being dispensed.

In a particular embodiment, the focal point can be moved along an optical axis of the objective lens. This allows multiple measurement signals to be generated. Each of the measurement signals is assigned to a position of a focal point along the optical axis. In other words, the determination device, in particular the objective lens, is moved along the optical axis, so that the focal points are offset relative to one another along the optical axis. Alternatively or additionally, other components of the determination device can be moved in order to move the focal point along the optical axis. A variable focal lens, a deformable mirror, an SLM (spatial light modulator) or any other suitable element can be used to move the focal point. In this respect, the liquid fill level can be determined particularly quickly by moving a holding device for holding the container and/or the determination device or components of the determination device along an optical axis of the objective lens. As a result, the liquid fill level can be quickly detected by moving the focal point along the optical axis, i.e. by moving only along a single axis. In particular, it is not necessary to move the focal point along a different axis.

In the determination device, all of the illumination light emitted by the illumination source can be focused at the focal point. The determination device thus differs from, for example, interferometric measurement methods in which the emitted illumination light is divided into a number of parts and the entire illumination light is therefore not focused at the focal point. In addition, the entire measurement signal reflected by the focal point can be detected by the two-dimensional detection device. With interferometric methods, more or less light will reach the detection device, depending on whether constructive or destructive interference predominates in the detector plane. In the case of complete destructive interference, for example, no light at all reaches the detector even though the illumination light fully illuminates the sample and the light is reflected back from the illumination focal point.

The dispensing device can have a control device. The control device can cause the determination device and the holding device to move relative to one another. In particular, the control device can cause the determination device to move relative to the holding device and/or the holding device relative to the determination device. In other words, the controller can cause the focal point to move. The control device can have one or more processors for processing data. Thus, the control device can have a printed circuit board. Alternatively, the control device may be a processor.

The quick determination of the lower boundary surface and/or the upper boundary surface of the liquid can also be achieved by carrying out only one measurement per object plane. This means that the container does not have to be scanned in the object plane. As will be explained in more detail below, it is advantageous if the holding device and/or the determination device are arranged in relation to one another in such a way that the focal point lies on a central axis of the container.

The determination device can have an imaging device for imaging the at least one measurement signal. The imaging device can be a camera and/or have the detection device. The imaging device can be configured in such a way that it generates an image based on the measurement signal. Using the imaging device, a plurality of images can be generated on the basis of a plurality of measurement signals. The individual measurement signals result from reflections at focal points, wherein the focal points differ in their position along the optical axis of the objective lens.

The evaluation device can evaluate at least one measurement signal and can determine the liquid fill level in the container based on the evaluation result. The measurement signal can also be evaluated on the basis of the images. In particular, at least one image can be evaluated and the liquid fill level can be detected based on the evaluation result. The evaluation device can be part of the imaging device. Alternatively, the evaluation device can be part of the control device.

The liquid fill level is the distance between the lower boundary surface and the upper boundary surface of the liquid. The liquid fill level can be determined by checking whether the focal point is on the upper boundary surface. In other words, a position of the determination device is searched for in which the focal point lies on the upper boundary surface. For this purpose, as described above, the determination device is moved along the optical axis and/or along or parallel to the central axis of the container.

The container can be part of a microtitre plate. Microtitre plates can be designed with a different number of containers. Thus, microtitre plates with 6 to 4096 containers are known, wherein microtitre plates with 96, 384 or 1536 containers are usually used.

In a special embodiment, the evaluation device can check whether an optical property of the measurement signal meets a threshold condition. In particular, the evaluation device can check whether a measurement signal intensity is greater than a predefined threshold value. The check can be carried out on the basis of the generated images. As a result, images and/or measurement signals can be excluded from further checks in a simple manner. Thus, the measurement signal intensity is lower, the greater the distance from the focal point to the lower and/or upper boundary surface. The threshold value can be specified by a user or stored in an electrical memory.

Alternatively or additionally, a measurement signal area can be checked. In this way, it can be checked whether the measurement signal area is larger than a predetermined threshold area. If this is the case, the focal point should be moved until the measurement signal area is smaller than the specified threshold area. In this case, the measurement signal intensity should also increase. The threshold area can be specified by the user or stored in an electrical memory.

In addition, the evaluation device can check whether at least one signal pattern has at least one pattern property. A signal pattern is created due to the spatial distribution of the measurement signal and is displayed in the image plane. The measurement signal can contain no signal patterns or a single signal pattern or a plurality of signal patterns. The evaluation device can evaluate the generated image according to the imaged signal pattern. The pattern property can be a physical and/or optical property of the signal pattern. The pattern property can be the pattern size and/or pattern intensity and/or pattern contour and/or pattern position of the signal pattern.

The fact is exploited that a signal pattern assigned to a lower boundary surface and/or an upper boundary surface has at least one specific pattern property. The relevant signal pattern preferably has a round contour or a substantially round contour. In addition, the relevant signal pattern may be located in the centre of the image or in the centre relative to the other signal patterns. A size of the signal pattern and/or a signal intensity also indicates whether the respective signal pattern is relevant or not.

The invention has the advantage that a lower and/or upper boundary surface of a liquid can also be detected when the boundary surface is moving or changing. This is possible because a two-dimensional detection device is arranged in the image plane and therefore a moving and/or changing measurement signal can also be continuously detected. In contrast to this, the one-dimensional, punctiform detection devices known from the prior art cannot be used because they do not detect a measurement signal when the boundary surface moves.

The evaluation device can determine a measured value for the signal pattern that has the at least one pattern property. In particular, the signal pattern can be evaluated to determine whether it is within a specified range. In this case, the part of the signal pattern that is in the specified range, or the entire signal pattern if it is in the specified range, is used to determine a measured value. In this case, signal values of the signal lying in the predetermined range can be added. Providing the predetermined area offers the advantage that it is ensured that a large number of measured values can be compared with one another.

It is possible for a measured value to be determined in each case for a plurality of signal patterns, each of which has the at least one pattern property. As a result, a plurality of measured values are available after evaluating a plurality of signal patterns. Thus, the number of measured values can correspond to the number of signal patterns. A value can be determined based on the determined measured values. The value can be determined by interpolation. In particular, the determined value can correspond to a maximum, in particular a local maximum. This procedure offers the advantage that the lower and/or upper boundary surface can be determined precisely and quickly. Thus, only a certain number of measured values must be determined, based on which the value can be determined. In particular, it is not necessary to move to a position in which the focal point lies on the lower and/or upper boundary surface.

It can then be checked whether the measured value and/or the determined value fulfils a value condition. In particular, it can be determined that the focal point is on the lower boundary surface and/or the upper boundary surface when the measured value and/or the determined value meets the value condition. It can be checked whether the measured value and/or the determined value is above a predetermined value. If this is the case, the value condition is met. This procedure offers the advantage that by checking the value condition it can be precisely determined whether the focal point lies in the lower and/or upper boundary surface, because signal patterns that would otherwise be regarded as relevant can be sorted out.

As a result, the lower and/or upper boundary surface is determined. The position of the determination device can be determined and stored in an electrical memory. The position of individual components of the determination device, such as the objective lens, is also regarded as the position of the determination device.

Knowing the position of the determination device and thus the upper boundary surface or the fill level is particularly advantageous in a dispensing process. As described above, after a liquid has been dispensed, a partial area of the container is scanned in order to be able to determine whether the dispensed liquid actually ended up in the container. If the upper boundary surface is known, the partial area to be scanned can be determined precisely, so that the scanning process does not take long.

In a particular embodiment, the control device can cause the container to be moved in a direction transverse or perpendicular to the optical axis of the objective lens when no measurement signal is detected. Alternatively or additionally, the control device can cause the determination device to be moved in a direction transverse or perpendicular to the optical axis of the objective lens when no measurement signal is detected. This may be necessary when the focal point is in a meniscus area of the liquid. In this case, the reflected light no longer, or only partially, reaches the objective lens, such that the check of the signal pattern described above cannot take place. A meniscus is a bulge in the surface of the liquid. The curvature can be concave or convex.

By moving the holding device for the container and/or the determination device or components of the determination device relative to one another, it can be ensured that the measurement signal reflected at the focal point largely passes through the objective lens. In this context, it has proven to be advantageous if a further illumination source is present, which illuminates the container, in particular over an area. The detection device can detect a further measurement signal emanating from the illuminated container.

Providing the additional illumination source has the advantage that a container edge can be determined on the basis of the further measurement signal. If the position of the determination device relative to the container is unfavourable, this can be recognised by the fact that only a container edge section is imaged in the image plane. The control device can then cause the container, in particular the holding device, to be moved relative to the receiving device when an evaluation of the further measurement signal shows that only a container edge section is recorded. Alternatively or additionally, the control device can cause the determination device to determine the lower and/or upper boundary surface to be moved relative to the container when an evaluation of the further measurement signal shows that only a container edge section is recorded.

The control device can cause the container and/or the determination device to determine the liquid fill level to be moved relative to one another in such a way that a central axis of the container is coaxial with the optical axis of the objective lens. In this case, the entire edge of the container is imaged in the image plane. The result of this is that the focal point is no longer located in the meniscus area of the liquid, but in a horizontal area of the liquid. In this respect, moving the container and/or the determination device relative to one another can be achieved in such a way that the meniscus area has no negative influence on the determination of the upper boundary surface.

The optical system between the illumination source and the container, and between the container and the detection device, can have one or more further lenses in addition to the objective lens. In this case, imaging is performed through the objective lens and the one or more lenses. In addition, a beam splitter can be arranged in the optical system between the illumination source and the container and/or between the container and the detection device. The beam splitter can be designed in such a way that it focuses the light of a first wavelength emitted by the illumination source in a specific ratio onto the focal point in the container. The transmitted light is blocked. In other words, the beam splitter can be designed in such a way that the illumination light is not diverted into a plurality of paths. In this case, the beam splitter can be a dichroic beam splitter. The beam splitter can be designed in such a way that it lets through the measurement signal of the first wavelength reflected by the focal point in a specific ratio, so that it can be detected by the two-dimensional detection device. The measurement signal from another illumination source, which is used, for example, for wide-field illumination and has a second wavelength, can be let through to a different proportion.

Figure 2:
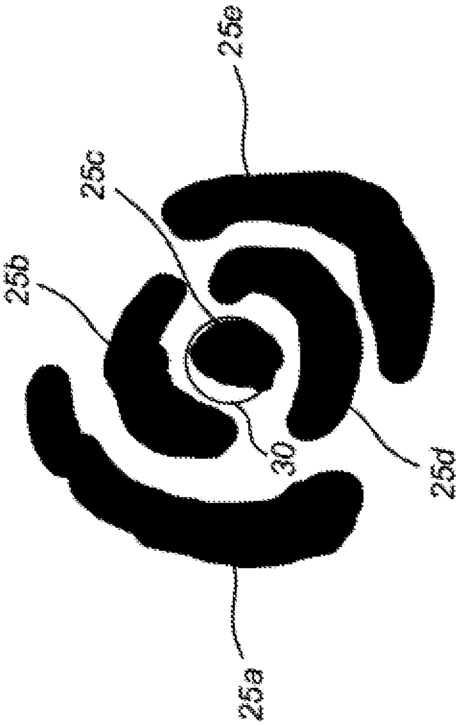
Figure 3:
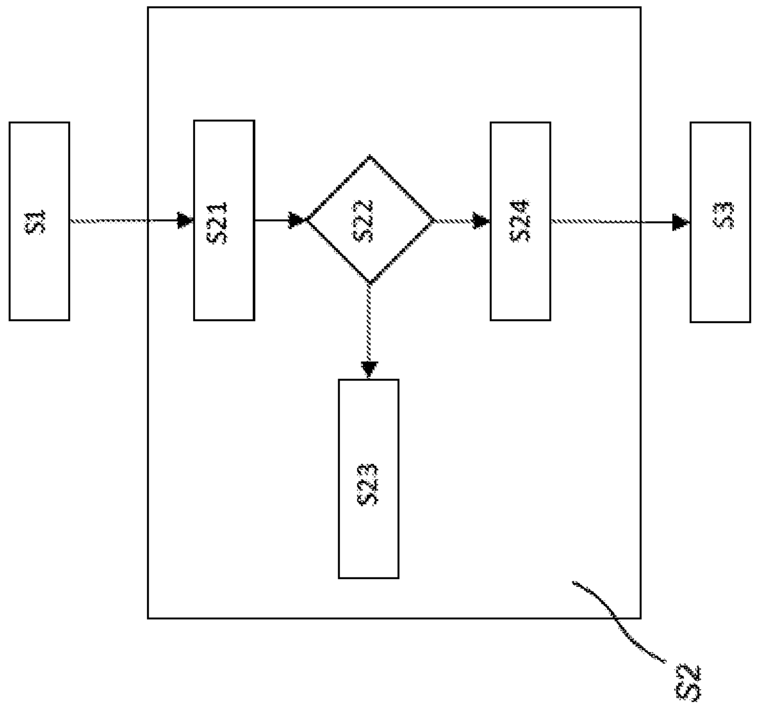
Figure 4:
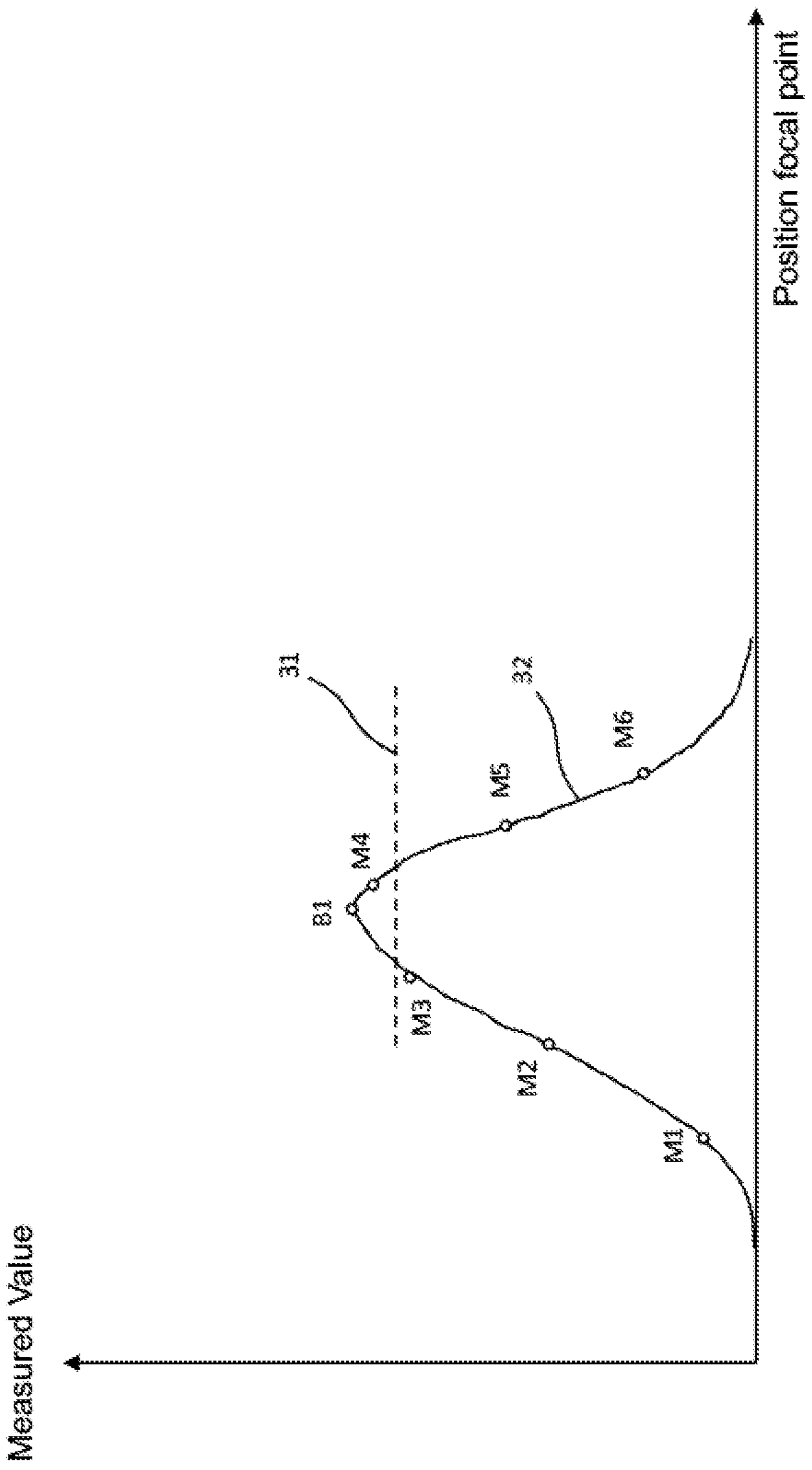
Figure 5:
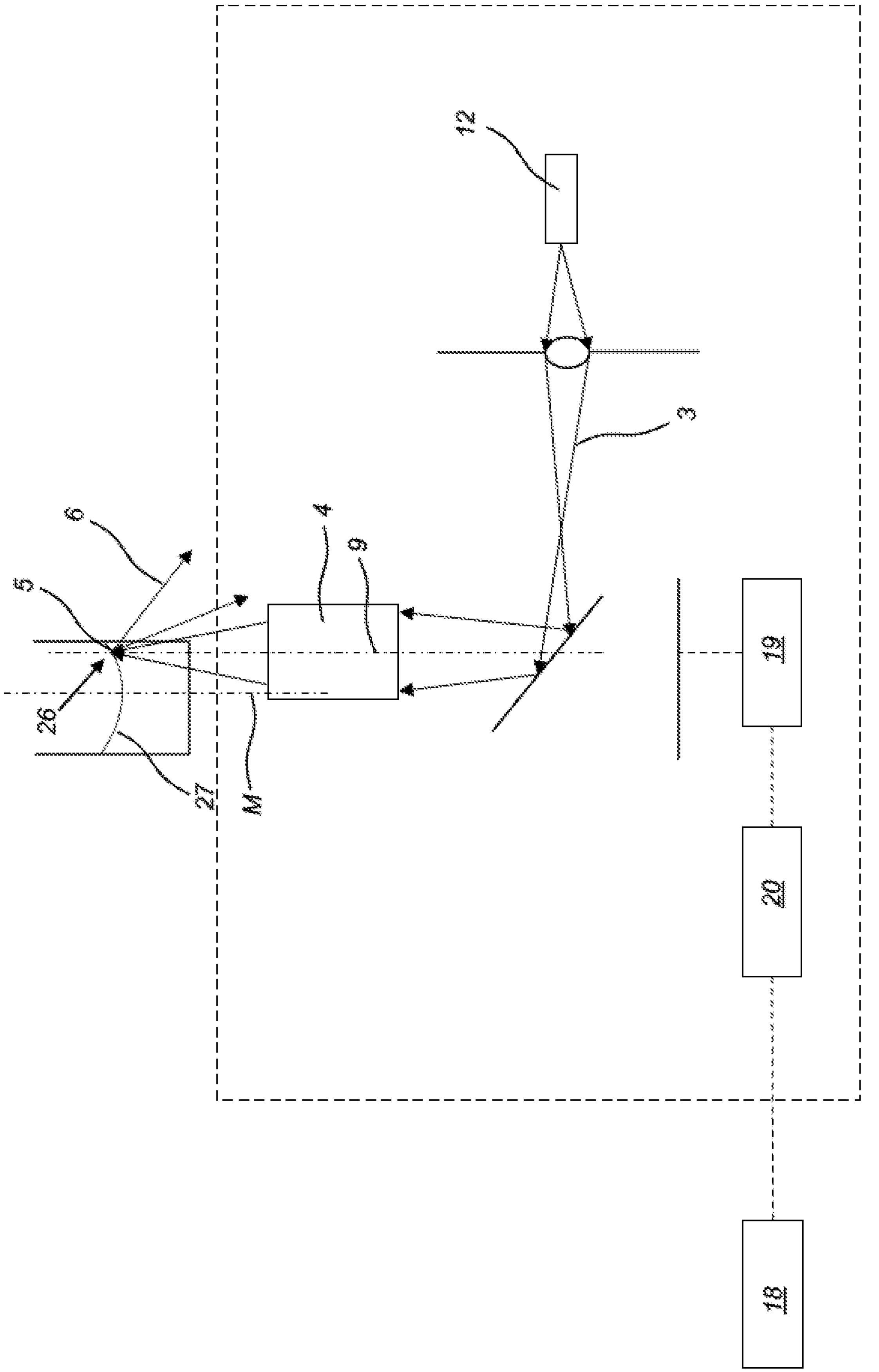
Figure 6:
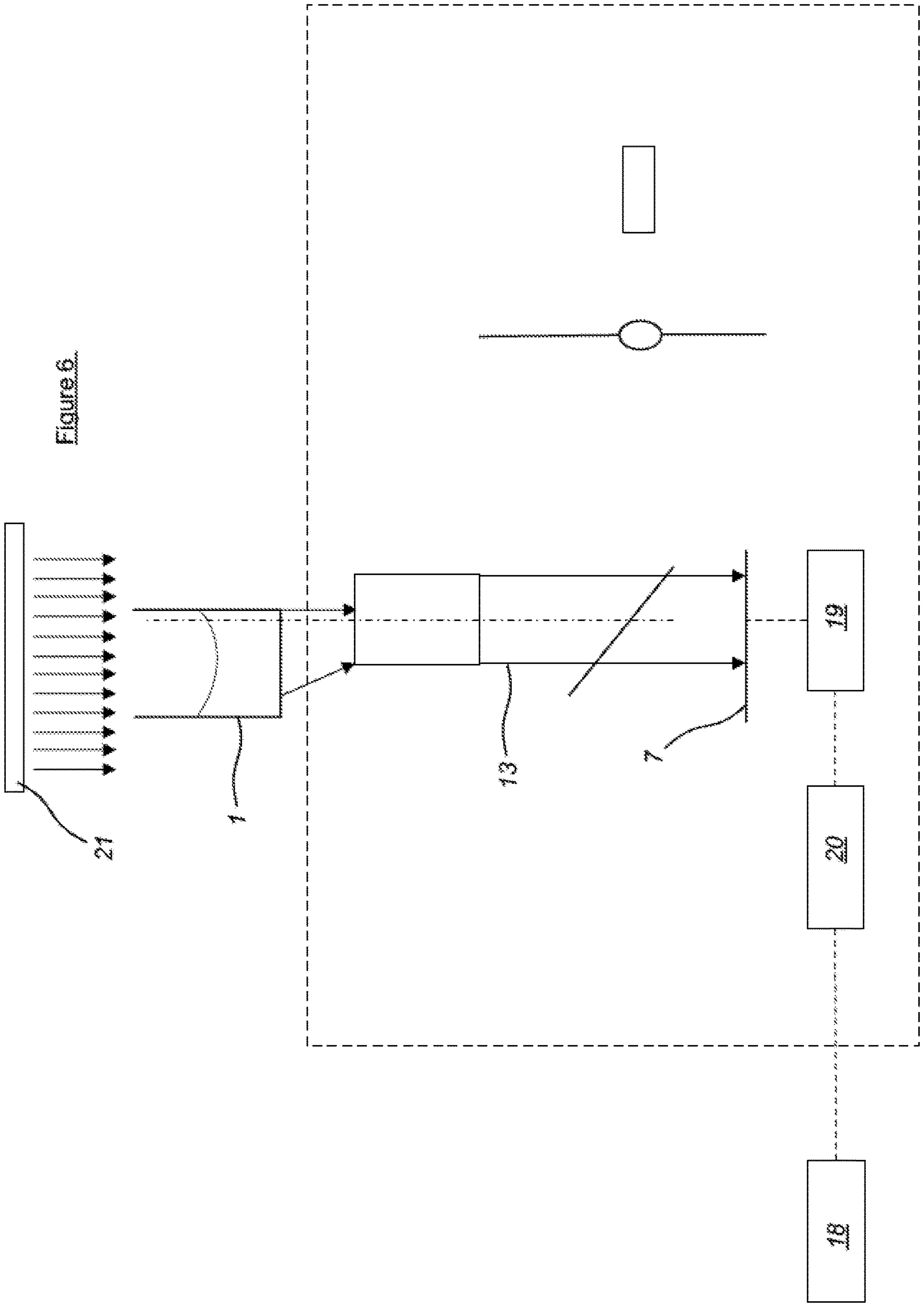
Figure 7:
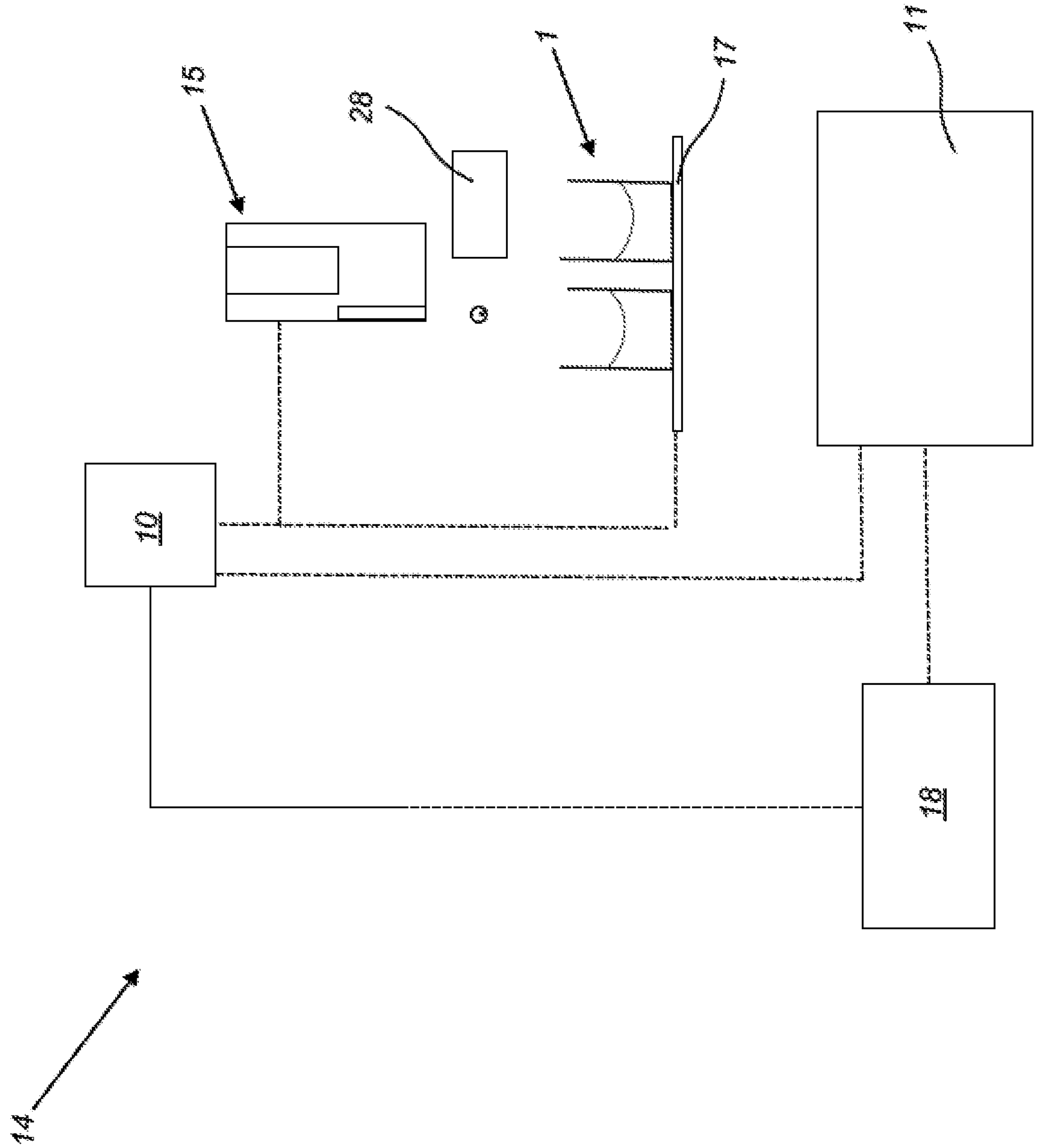

The subject matter of the invention is shown schematically in the figures, wherein elements that are the same or have the same effect are mostly provided with the same reference symbols. In the figures:

FIG. 1 shows a representation of a determination device and a container,

FIG. 2 shows a representation of signal patterns imaged in the detector device, FIG. 3 shows a flow chart for determining the fill level in the container, FIG. 4 shows a plurality of measured values depending on the position of the focal point, FIG. 5 shows a representation of the determination device shown in FIG. 1, in which the illumination source emits illumination light, FIG. 6 shows a representation of the determination device shown in FIG. 1, in which the further illumination source emits illumination light, FIG. 7 shows a representation of a dispensing device with the determination device.

The determination device 11 shown in FIG. 1 is used to determine an upper boundary surface 27, in particular a liquid surface, and/or a lower boundary surface 29, in particular a liquid bottom, of a liquid 2 in a container 1. The container 1 is filled with a liquid 2. The liquid fill level F corresponds to the distance between the lower boundary surface 29 and the upper boundary surface 27 along a central axis M of the container 1.

The determination device 11 has an illumination source 12 for emitting illumination light 3. In addition, the determination device 11 has an objective lens 4 for focusing the illumination light 3 at a focal point 5 that is located inside the container 1. This means that the determination device 11, in particular the objective lens 4, and the container 1 are arranged in relation to one another in such a way that the focal point 5 is located in the container 1. In the arrangement shown in FIG. 1, the central axis M of the container 1 and an optical axis 9 of the objective lens 4 are arranged coaxially to one another.

The determination device 11 also has a two-dimensional detection device 7. The two-dimensional detection device 7 can be a CCD detector. In addition, the two-dimensional detection device 7 is arranged in an image plane 8 of the objective lens 4 and detects a measurement signal 6 reflected at the focal point 5. In the figures, the illumination light 3 is shown with solid lines and the measurement signal 6 is shown with dashed lines.

In addition, the determination device 11 has an imaging device 19 and an evaluation device 20. Based on the detected measurement signal 6, the evaluation device 20 determines the liquid fill level of the liquid 2 in the container 1. The imaging device 19 is electrically connected to the detection device 7. In particular, the imaging device 19 generates an image on the basis of the detected measurement signal 6. The evaluation device 20 is electrically connected to the imaging device 19 and evaluates the image and/or the detected measurement signal 6. The evaluation result of the evaluation device 20 can be transmitted to a control device 18 of a dispensing device 14 shown in FIG. 6.

The illumination source 12 can be a fibre or laser diode, or other suitable illumination source. In particular, the illumination source 12 can emit illumination light of a predetermined wavelength. The emitted illumination light 3 is brought to a suitable angle of divergence by a lens 16. The illumination light 3 is forwarded to a beam splitter 23. The beam splitter can be a dichroic beam splitter. The light deflected by the beam splitter 23 passes through the objective lens 4 and is focused at the focal point 5. The beam splitter 23 is designed in such a way that it deflects at least part of the illumination light 3, in particular all of the illumination light 3, in the direction of the objective lens 4. In addition, at least part of the measurement signal 6 passes through the beam splitter 23.

The measurement signal 6 reflected from the focal point 5 is focused by the objective lens 4 at the point 24 of the image plane 8. The measurement signal 6 passes through the beam splitter 23 and is detected by the detection device 7 arranged in the image plane 8. Since the detection device 7 is a two-dimensional detection device 7, the fill level can be detected even when the upper boundary surface 27 is in motion due to a displacement of the container 1 and/or vibrations. This causes the point 24 in the image plane 8 to be shifted perpendicular to the optical axis 9. Due to the two-dimensional design of the detection device 7, the shifted point 24 can also be detected.

FIG. 2 shows an exemplary representation of the measurement signal 6 imaged in the image plane 8. The measurement signal 6 is detected by the detector device 7 and has a plurality of signal patterns, namely a first signal pattern 25*a*, a second signal pattern 25*b*, a third signal pattern 25*c*, a fourth signal pattern 25*d* and a fifth signal pattern 25*e*. The individual signal patterns 25*a*-25*e* differ from one another in their pattern properties. In particular, they differ from one another in pattern size, pattern position and pattern contour.

A predetermined area 30 is also drawn in in FIG. 2 in the area of the third signal pattern 25*c*. Part of the third signal pattern 25*c* lies in the specified area 30.

FIG. 3 shows a flow chart for determining the upper boundary surface 27 of the liquid 2 in the container 1. In a first step S1, the illumination source 12 is switched on, so that the container 1, in particular the focal point 5, is exposed to illumination light 3. In particular, the illumination light 3 emitted, in particular the entirety of it, emitted by the illumination source 12 is focused at the focal point 5 and the measurement signal 6 reflected from the focal point 5, which is a reflected measurement light, is detected in the detection device 7. The imaging device 19 generates an image based on the detected measurement signal 6.

Subsequently, the determination device 11 is moved along the optical axis 9 so that the focal point 5 is offset along the optical axis 9. A new image is generated with each method step. As a result, a large number of detected measurement signals 6 are obtained and/or a large number of images are generated that show the focal point 5 at different positions along the optical axis 8. FIG. 1 shows the position of the determination device 11 in which the focal point 5 is on the upper boundary surface 27.

The evaluation device 20 evaluates the images and/or the detected measurement signal 6 in a second step S2. The evaluation of the measurement signal 6 in the second step has a number of sub-steps.

In a first sub-step S21, the measurement signal intensity is determined. In a second sub-step S22, it is checked whether the measurement signal intensity exceeds a predetermined threshold value. If this is not the case, in a third sub-step S23 the generated image is discarded and/or the measurement signal 6 is not processed further.

If the measured signal intensity determined is above the predetermined threshold value, a fourth sub-step S24 checks whether the signal patterns 25*a*-25*d* shown in FIG. 2 have at least one pattern property. The check can be carried out for each image or measurement signal. In particular, in this case all signal patterns are evaluated, as described below, and a decision is then made as to which of the signal patterns is relevant for determining the upper boundary surface 27, in particular the phase boundary between the liquid and the air.

Thus, in the fourth sub-step S24, it is checked whether the respective signal pattern has a predetermined pattern contour and/or a specific pattern position and/or a pattern size. As a result, for example, signal patterns that are not round or essentially round in shape and/or are larger than a predetermined size can be filtered out. In addition, signal patterns that are located at the edges of the image and are therefore not centrally located are discarded. When these principles are applied, it is determined with the signal patterns shown in FIG. 2 that the third signal pattern 25*c* is the relevant signal pattern. For this signal pattern, the signal is added that is located in a central predetermined area 30 with a predetermined size. The predetermined area 30 can be dependent on the detection device 7 and is shown by way of example as a circular area of the third signal pattern 25*c*. This added signal results in a measured value M1-M6.

In a third step S3, the position of the determination device 11 is stored in an electrical memory, to which the signal added in the signal pattern 25*c*, the measured value M1-M6, is also stored in the electrical memory. This procedure is repeated for a plurality, but at least one, position of the determination device. The position of the determination device 11 at which the focal point 5 is located on the liquid surface 27 can be determined from the stored data.

This is explained using FIG. 4. FIG. 4 shows the course of a plurality of measured values M1-M6 over the position of the focal point 5 and/or the position of the determination device 11. FIG. 4 shows the progression of measured values that result in the vicinity of the upper boundary surface 27.

It is checked whether a value condition is met. In particular, it is checked whether the individual measured values M1-M6 are below or above a predetermined measured value 31, in particular a value line. The measured values M1-M3 and M5 and M6 are below the specified value 31, in particular a value line, and are not considered relevant.

The focal point 5 lies on the upper boundary surface 27 when the measured value exceeds the determined, previously specified (instrument-dependent) measured value 31 and/or when the measured value reaches a local maximum, i.e. the measured values of the positions above and below the focal point 5 have a significantly lower value. The check utilises the fact that the reflecting surface, in particular the upper boundary surface 27, has been reached with sufficient accuracy when the measured value exceeds the predetermined measured value 31. This requirement is met with the measured value M4.

Alternatively or additionally, the data from a plurality of measured values M1-M6 can be interpolated and a curve 32 can be generated. A value B1 can then be determined on the basis of the measured values M1-M6. The value B1 corresponds to a maximum of the curve 32. The maximum of the curve 32 or the determined value B1 is then at the position of the determination device 11 that corresponds to the upper boundary surface 27.

In a dispensing process by the dispensing device 14 shown in FIG. 7, the determination device 11 can thus determine precisely the partial area of the container 1 to be scanned if it knows the fill level, in particular the upper boundary surface 27. As already described above, a partial area is scanned in order to determine whether the dispensed droplet has landed in the container.

FIG. 3 describes a sequence of how an upper boundary surface 27 of the liquid 2 is determined. The lower boundary surface 29 can be determined in the same way as the upper boundary surface 27.

FIG. 5 shows a representation of the determination device 11 shown in FIG. 1, in which the illumination source 12 emits illumination light. In contrast to FIG. 1, the container 1 and the receiving device 11 are arranged relative to one another in such a way that the central axis M of the container 1 and an optical axis 9 of the objective lens 4 are not coaxial to one another. This means that the focal point 5 is not on the central axis M of the container. The focal point 5 is in a meniscus area 26 of the liquid 2. As can be seen from FIG. 5, the measurement signal 6 reflected by the focal point 5 does not reach the objective lens 4 and therefore cannot be detected by the detection device 7.

FIG. 6 shows an illustration of the determination device shown in FIG. 1, in which a further illumination source 21 (not shown in FIG. 1) emits illumination light. The additional illumination source 21 is used to to illuminate the area of the container 1. The detection device 7 receives a further measurement signal 13 emanating from the container 1. In the present case, no illumination light is emitted by the illumination source 12. The illumination source 12 and the additional illumination source 21 are arranged on opposite sides of the container 1.

The evaluation device 20 evaluates the further measurement signal 13 to determine whether a container edge, in particular the entire container edge, is detected. In the arrangement shown in FIG. 6, it is determined that only part of the edge of the container is detected. The evaluation device 20 transmits the evaluation result to the control device 18. This causes the determination device 11 and/or the container 1 to be moved in such a way that the central axis M of the container 1 is coaxial to the optical axis 9. In this case, the state shown in FIG. 1 is present and the detection device 7 detects the entire edge of the container.

FIG. 7 shows a representation of a dispensing device 14 with the determination device 11. The additional illumination source 21 is not represented in FIG. 7. The dispensing device 13 has a dispenser 15 for dispensing a liquid 2. The liquid dispensed may contain no biological particles or may contain at least one particle. The dispenser 15 can be a droplet generator that, as shown in FIG. 7, dispenses liquid in the form of a droplet.

FIG. 7 shows a state in which the dispenser 15 has dispensed a droplet. The droplet is fed into a container 1. FIG. 7 shows two containers 1 that are held by a holding device 17 of the dispensing device 14. The dispenser 15 is actuated to dispense the droplet by an actuator (not shown), in particular a piezo actuator.

The evaluation device 20 is electrically connected to the control device 18. The control device 18 is electrically connected to a displacement device 10. The displacement device 10 can move the dispenser 15 and/or the holding device 17 in such a way that the droplet can be dispensed into the desired storage location. In addition, the displacement device 10 can move the holding device 17 and/or the determination device 11 in order to determine the fill level F in the container 1, as described above.

In addition, the control device 18 can control a deflection and/or interception device 28 of the dispensing device 1. In this case, the control device 18 can control the deflection and/or interception device 28 in such a way that the dispensed droplet is deflected and/or intercepted before it reaches a container if, for example, a particle condition is not met.

LIST OF REFERENCE SIGNS

1 Container
2 Liquid
3 Illumination light
4 Objective lens
5 Focal point
6 Measurement signal
7 Detection device
8 Image plane
9 Optical axis
10 Displacement device
11 Determination device
12 Illumination source
13 Further measurement signal
14 Dispensing device
15 Dispenser
16 Lens
17 Holding device
18 Control device
19 Imaging device
20 Evaluation device
21 Further illumination source
23 Beam splitter
24 Point in the image plane
**25*a*** First signal pattern
**25*b*** Second signal pattern
**25*c*** Third signal pattern
**25*d*** Fourth signal pattern
**25*e*** Fifth signal pattern
26 Meniscus area
27 Upper boundary surface
28 Deflection and/or interception device
29 Lower boundary surface
30 Predetermined area
31 Predetermined measured value
32 Curve
M Central axis of the container
F Liquid fill level
M1-M6 Measured values
B1 Determined value

The invention claimed is:

1. A method for determining at least one of a lower boundary surface and an upper boundary surface of a liquid located in a container, in which illumination light is emitted, which is focused by an objective lens at a focal point, wherein a measurement signal reflected at the focal point (5) is detected by a two-dimensional detection device arranged in an image plane of the objective lens, wherein the measurement signal propagates to the two-dimensional detection device without interference from light split from the illumination light, and wherein based on the detected measurement signal, at least one of the lower boundary surface and the upper boundary surface is detected by evaluating the detected measurement signal, wherein evaluating the detected measurement signal includes evaluating at least one signal pattern of the detected measurement signal to check whether the at least one signal pattern has one or more pattern properties each meeting a respective predetermined criterion, wherein the one or more pattern properties includes at least one of a pattern size, a pattern contour, and a pattern position.

2. The method according to claim 1, wherein the focal point is moved along an optical axis of the objective lens.

3. The method according to claim 1, wherein at least one of the following steps (a) through (d) occurs:

a. based on the measurement signal, an image is generated, b. based on the measurement signals, multiple images are generated, wherein the measurement signals originate from focal points that are offset relative to one another in the direction of the optical axis of the objective lens, c. at least one measurement signal is evaluated and, based on the evaluation result, at least one of the lower boundary surface and the upper boundary surface is detected, and d. at least one image is evaluated and, based on the evaluation result, at least one of the lower boundary surface and the upper boundary surface is determined.

4. The method according to claim 3, wherein at least one of the following steps (a) through (e) occurs:

a. as part of the evaluation, it is checked whether an optical property of the measurement signal meets a threshold value condition, b. as part of the evaluation, it is checked whether a measurement signal intensity is greater than a threshold value, c. as part of the evaluation, it is checked whether a measurement signal area imaged on the detection device is larger than a predetermined threshold value area, d. as part of the evaluation, at least one signal pattern is evaluated, and e. as part of the evaluation, at least one signal pattern for the at least one measurement signal is evaluated, for which the threshold value condition is met.

5. The method according to claim 4, wherein it is checked whether the at least one signal pattern has at least one pattern property of the following pattern properties: pattern size, pattern intensity, pattern contour, and pattern position.

6. The method according to claim 5, wherein at least one of the following steps (a) through (d) occurs:
a. a measured value is determined on the basis of the signal pattern, which has the at least one pattern property,
b. the signal pattern, which has the at least one pattern property, is evaluated as to whether it lies in a predetermined range, and a measured value is determined on the basis of the signal pattern lying in the predetermined range,
c. it is checked whether the measured value fulfils a measured value condition, and
d. it is determined that the focal point is on at least one of the lower boundary surface and the upper boundary surface when the measured value meets the measured value condition.

7. The method according to claim 1, wherein at least one of the following steps (a) through (b) occurs:
a. the container is moved in a direction transverse or perpendicular to the optical axis of the objective lens when no measurement signal is detected, and
b. a determination device for determining at least one of the lower boundary surface and the upper boundary surface of the liquid is moved in a direction transverse or perpendicular to the optical axis of the objective lens when no measurement signal is detected.

8. The method according to claim 1, wherein a further illumination source is provided, which illuminates the container over an area, wherein the detection device detects a further measurement signal emanating from the illuminated container.

9. The method according to claim 8, wherein at least one of the following steps (a) through (b) occurs:
a. the container is moved when an evaluation of the further measurement signal shows that only a container edge section is received, and
b. a determination device for determining at least one of the lower boundary surface and the upper boundary surface of the liquid is moved when an evaluation of the further measurement signal shows that only a container edge section is received.

10. The method according to claim 1, wherein at least one of the following steps (a) through (d) occurs:
a. the container is moved in such a way that a central axis of the container is coaxial to an optical axis of the objective lens,
b. the container is moved in such a way that the container edge is received,
c. a determination device for determining at least one of the lower boundary surface and the upper boundary surface of the liquid is moved in such a way that a central axis of the container is coaxial to an optical axis of the objective lens, and
d. a determination device for determining at least one of the lower boundary surface and the upper boundary surface of the liquid is moved in such a way that the container edge is received.

11. A determination device for carrying out a method according to claim 1, for determining at least one of a lower boundary surface and an upper boundary surface of a liquid located in the container, the determination device comprising:
an illumination source for emitting illumination light,
an objective lens for focusing the illumination light at a focal point,
a two-dimensional detection device which is arranged in an image plane of the objective lens and detects a measurement signal reflected at the focal point, wherein the measurement signal propagates to the two-dimensional detection device without interference from light split from the illumination light, and
an evaluation device which, based on the measurement signal, determines at least one of the lower boundary surface and the upper boundary surface of the liquid in the container,
wherein the evaluation device is configured to evaluate the detected measurement signal by evaluating at least one signal pattern of the detected measurement signal to check whether the at least one signal pattern has one or more pattern properties each meeting a respective predetermined criterion, wherein the one or more pattern properties includes at least one of the following pattern properties: a pattern size, a pattern contour, and a pattern position.

12. The determination device according to claim 11, wherein the determination device has an imaging device for imaging the at least one measurement signal.

13. The determination device according to claim 11, wherein the evaluation device is configured such that the evaluation device operates according to at least one of the following protocols (a) through (d):
a. the evaluation device evaluates at least one measurement signal and, based on the evaluation result, determines at least one of the lower boundary surface and the upper boundary surface of the liquid in the container,
b. the evaluation device evaluates at least one image and, based on the evaluation result, determines at least one of the lower boundary surface and the upper boundary surface of the liquid in the container,
c. the evaluation device checks, in the generated image, whether an optical property of the measurement signal meets a threshold condition, and
d. the evaluation device checks, in the generated image, whether at least one signal pattern has at least one pattern property of the following pattern properties: pattern size, pattern contour, and pattern position.

14. The determination device according to claim 13, wherein the evaluation device is configured such that the evaluation device operates according to at least one of the following protocols (a) through (e):
a. the evaluation device determines a measured value on the basis of the signal pattern, which has the at least one pattern property,
b. the evaluation device determines a plurality of measured values on the basis of the signal pattern that have the at least one pattern property, and a value is determined on the basis of the measured values,
c. the evaluation device evaluates the signal pattern, which has the at least one pattern property, as to whether the signal pattern lies in a predetermined range, and a measured value is determined on the basis of the signal pattern lying in the predetermined range,
d. the evaluation device checks whether at least one of the measured value and the determined value fulfils a value condition, and
e. the evaluation device determines that the focal point is on at least one of the lower boundary surface and the upper boundary surface when at least one of the measured value and the determined value meets the value condition.

15. A dispensing device with a dispenser for dispensing liquid into a container and a determination device according to claim 11.

16. The dispensing device according to claim 15, wherein the dispensing device has a holding device for receiving at least one container.

17. The dispensing device according to claim 16, wherein the dispensing device has a control device configured to cause at least one of the following (a) through (d):

a. move the determination device and the holding device relative to one another, b. move the determination device relative to the holding device, c. move the holding device relative to the determination device, and d. move at least one of the holding device and the determination device in a direction along an optical axis of the objective lens.

18. The dispensing device according to claim 17, wherein the dispensing device has a further illumination source for illuminating the container over a wide area and the control device is configured to cause at least one of the following (a) through (c):

a. the container to be moved in a direction transverse or perpendicular to the optical axis of the objective lens when no measurement signal is detected, b. the determination device to be moved in a direction transverse or perpendicular to the optical axis of the objective lens when no measurement signal is detected, c. the two-dimensional detection device to detect a further measurement signal emanating from the illuminated container.

19. The dispensing device according to claim 18, wherein the control device is configured to cause at least one of the following (a) through (b):

a. the container to be moved when an evaluation of the further measurement signal by the evaluation device shows that only one container edge section has been received, and b. the determination device to be moved when the evaluation of the further measurement signal by the evaluation device shows that only one container edge section is detected.

20. The dispensing device according to claim 17, wherein the control device is configured to cause at least one of the following (a) through (d):

a. the container to be moved such that a central axis of the container is coaxial with an optical axis of the objective lens, b. the container to be moved such that the container edge is received, c. the determination device to be moved such that the central axis of the container is coaxial with the optical axis of the objective lens, and d. the determination device to be moved such that the container edge is received.

* * * * *